United States Patent
Liang (10) Patent No.: US 12,070,681 B2
(45) Date of Patent: Aug. 27, 2024

(54) VIRTUAL PROP CONTROL METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Chao Liang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 73 days.

(21) Appl. No.: 17/516,516

(22) Filed: Nov. 1, 2021

(65) Prior Publication Data

US 2022/0054935 A1     Feb. 24, 2022

Related U.S. Application Data

(63) Continuation of application No. PCT/CN2020/122189, filed on Oct. 20, 2020.

(30) Foreign Application Priority Data

Dec. 16, 2019 (CN) .................. 201911295543.X (51) Int. Cl.
*A63F 13/426* (2014.01)
*A63F 13/219* (2014.01)
(Continued)

(52) U.S. Cl.
CPC .......... *A63F 13/426* (2014.09); *A63F 13/219* (2014.09); *A63F 13/56* (2014.09); *A63F 13/577* (2014.09)

(58) Field of Classification Search
None
See application file for complete search history.

(56) References Cited

U.S. PATENT DOCUMENTS 9,004,997 B1    4/2015 Prosin et al.
11,465,040 B2 *  10/2022 Hall .................. A63F 13/5372
(Continued)

FOREIGN PATENT DOCUMENTS

CN    105148520 A     12/2015
CN    105597311 A  *   5/2016   ......... A63F 13/2145
(Continued)

OTHER PUBLICATIONS

"Inverse Trigonometry functions" from Math Open Reference website at https://www.mathopenref.com/triginverse.html (Year: 2011).*

(Continued)

*Primary Examiner* — Malina D. Blaise
*Assistant Examiner* — Andrew Bodendorf
(74) *Attorney, Agent, or Firm* — Morgan, Lewis & Bockius LLP (57) ABSTRACT

The present disclosure discloses a virtual prop control method performed by an electronic device. The method includes: displaying an aiming point of a virtual shooting prop, the virtual shooting prop being controlled by a first virtual operation object associated with the electronic device; when a second virtual operation object is determined as an attachment target of the virtual shooting prop, determining, according to an angle between a position of an aiming point of a virtual shooting prop and a target position of a target virtual operation object, that is, a target rotation angle, a rotation manner of a direction aimed at by the aiming point; and when the rotation manner is a time-based rotation manner, automatically rotating, by the target rotation angle according to a predetermined time duration, the direction aimed at by the aiming point, to align with a target position on a second virtual operation object.

18 Claims, 6 Drawing Sheets

(51) Int. Cl.
*A63F 13/56* (2014.01)
*A63F 13/577* (2014.01)

(56) References Cited

U.S. PATENT DOCUMENTS

| | | | | |
|---|---|---|---|---|
| 11,845,007 | B2* | 12/2023 | Yang | A63F 13/55 |
| 2008/0026843 | A1 | 1/2008 | Nakasaka | |
| 2009/0163274 | A1* | 6/2009 | Kando | A63F 13/577 |
| | | | | 463/31 |
| 2010/0009733 | A1* | 1/2010 | Garvin | A63F 13/22 |
| | | | | 463/37 |
| 2015/0031421 | A1* | 1/2015 | Jo | A63F 13/30 |
| | | | | 463/2 |
| 2016/0317913 | A1* | 11/2016 | Chen | G06F 3/03547 |
| 2020/0285370 | A1* | 9/2020 | Hao | A63F 13/577 |
| 2021/0245062 | A1* | 8/2021 | Wu | A63F 13/5258 |
| 2021/0275914 | A1* | 9/2021 | Wu | A63F 13/577 |

FOREIGN PATENT DOCUMENTS

| | | | | | |
|---|---|---|---|---|---|
| CN | 107913515 | A | | 4/2018 | |
| CN | 107913515 | A | * | 4/2018 | A63F 13/2145 |
| CN | 108310764 | A | * | 7/2018 | A63F 13/42 |
| CN | 108310764 | A | | 7/2018 | |
| CN | 108404407 | A | * | 8/2018 | A63F 13/42 |
| CN | 108415639 | A | * | 8/2018 | A63F 13/525 |
| CN | 108415639 | A | | 8/2018 | |
| CN | 109550241 | A | * | 4/2019 | A63F 13/2145 |
| CN | 109718559 | A | | 5/2019 | |
| CN | 109847336 | A | * | 6/2019 | A63F 13/2145 |
| CN | 109847336 | A | | 6/2019 | |
| CN | 105597311 | B | * | 7/2019 | A63F 13/2145 |
| CN | 110393916 | A | * | 11/2019 | A63F 13/2145 |
| CN | 110433489 | A | | 11/2019 | |
| CN | 110548286 | A | | 12/2019 | |
| CN | 111111168 | A | | 5/2020 | |

OTHER PUBLICATIONS

Tencent Technology, ISR, PCT/CN2020/122189, Jan. 19, 2021, 3 pgs.
Tencent Technology, WO, PCT/CN2020/122189, Jan. 19, 2021, 5 pgs.
Tencent Technology, IPRP, PCT/CN2020/122189, May 17, 2022, 6 pgs.

* cited by examiner

VIRTUAL PROP CONTROL METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2020/122189, entitled "METHOD AND DEVICE FOR CONTROLLING VIRTUAL PROP, AND STORAGE MEDIUM AND ELECTRONIC DEVICE" filed on Oct. 20, 2020, which claims priority to Chinese Patent Application No. 201911295543.X, filed with the State Intellectual Property Office of the People's Republic of China on Dec. 16, 2019, and entitled "VIRTUAL PROP CONTROL METHOD AND APPARATUS, STORAGE MEDIUM, AND ELECTRONIC DEVICE", all of which are incorporated herein by reference in their entirety.

FIELD OF THE TECHNOLOGY

The present disclosure relates to the field of games, and specifically, to a virtual prop control method and apparatus, a storage medium, and an electronic device.

BACKGROUND OF THE DISCLOSURE

In a current mobile game, it is very difficult for a game player to aim at an enemy on a mobile phone, and the player usually needs to aim at a target object a plurality of times. However, because the target object may keep moving, it is quite difficult to accurately aim at the target object with an aiming point of a shooting prop when the distance between the target object and the aiming point varies all the time.

For the foregoing problems, no effective solution has been provided yet.

SUMMARY

Embodiments of this application provide a virtual prop control method and apparatus, a storage medium, and an electronic device.

A virtual prop control method is provided, performed by an electronic device, including: displaying an aiming point of a virtual shooting prop, the virtual shooting prop being controlled by a first virtual operation object associated with the electronic device; when a second virtual operation object is determined as an attachment target of the virtual shooting prop, determining, according to a target rotation angle, a rotation manner of a direction aimed at by the aiming point, the target rotation angle being an angle required for rotating the direction aimed at by the aiming point, to align with a target position on the second virtual operation object; and when the rotation manner is a time-based rotation manner, automatically rotating, by the target rotation angle according to a predetermined time duration, the direction aimed at by the aiming point, to align with the target position on the second virtual operation object.

A non-transitory computer-readable storage medium is provided, the computer-readable storage medium storing a plurality of computer programs, the computer programs, when executed by a processor of an electronic device, causing the electronic device to perform the foregoing virtual prop control method.

An electronic device is provided, including a memory, a processor, and a plurality of computer programs stored in the memory, the computer programs, when executed by the processor, causing the electronic device to perform the foregoing virtual prop control method.

Details of one or more embodiments of this application are provided in the subsequent accompanying drawings and descriptions. Other features and advantages of this application become obvious with reference to the specification, the accompanying drawings, and the claims.

BRIEF DESCRIPTION OF THE DRAWINGS

The accompanying drawings described herein are intended to provide further understanding of the present disclosure and constitute a part of the present disclosure. Exemplary embodiments of the present disclosure and the description thereof are used for explaining the present disclosure rather than constituting the improper limitation to the present disclosure. In the accompanying drawings.

DESCRIPTION OF EMBODIMENTS

To make a person skilled in the art understand the solutions in the present disclosure better, the following describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure shall fall within the protection scope of the present disclosure.

The terms such as "first" and "second" in this specification, the claims, and the foregoing accompanying drawings of the present disclosure are intended to distinguish between similar objects rather than describe a particular sequence or a chronological order. It is to be understood that data used in this way is exchangeable in a proper case, so that the embodiments of the present disclosure described herein can be implemented in an order different from the order shown or described herein. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

According to an aspect of the embodiments of the present disclosure, a virtual prop control method is provided. In some embodiments, the virtual prop control method may be applicable to, but not limited to, a virtual prop control system in a hardware environment shown in FIG. 1. The virtual prop control system includes, but is not limited to, a terminal device 102, a network 110, and a server 112. A target game application run on the terminal device 102 is used for controlling a target virtual role to complete a game task in a game scene.

Figure 1:
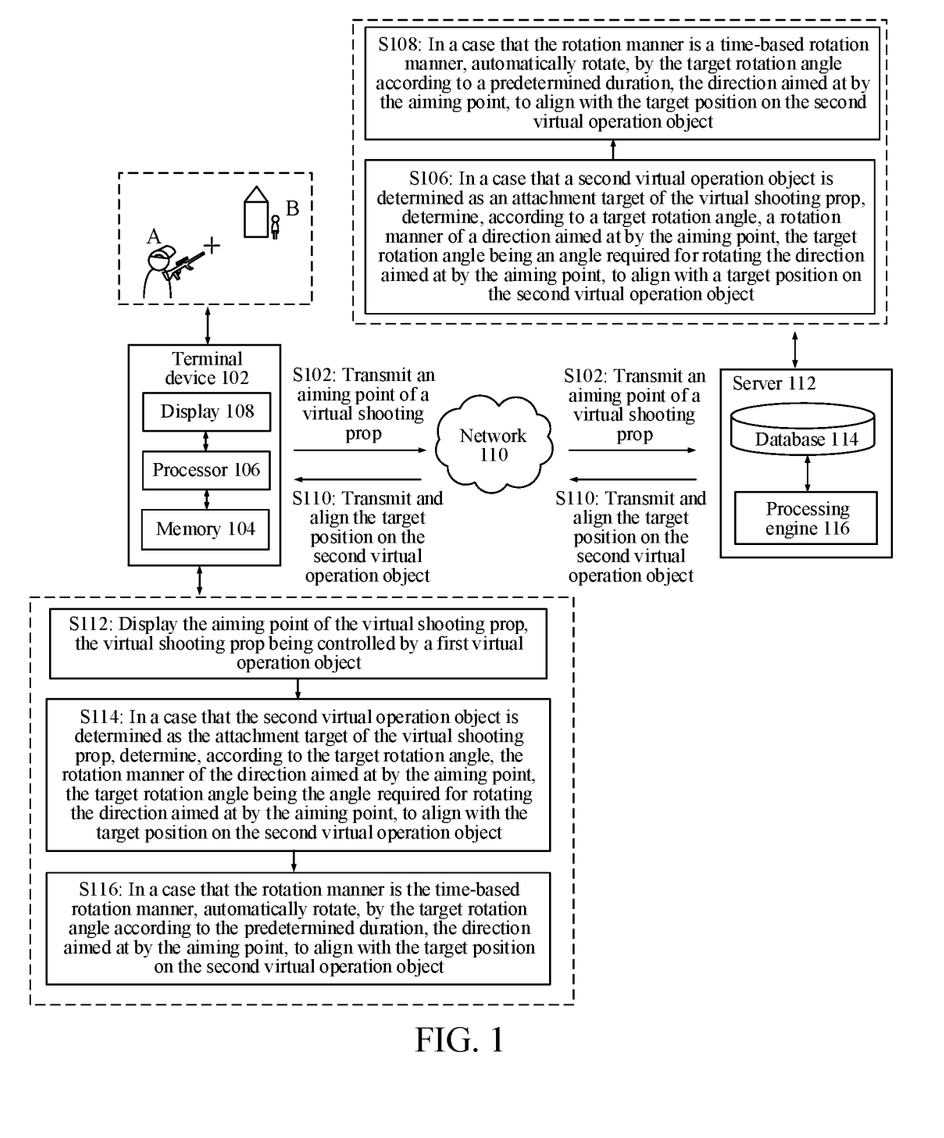
FIG. 1 is a schematic diagram of an application environment of an exemplary virtual prop control method according to an embodiment of the present disclosure.

The terminal device 102 may include, but is not limited to, a human-computer interaction screen 104, a processor 106, and a memory 108. The human-computer interaction screen 104 is configured to obtain human-computer interaction instructions through a human-computer interaction interface, and is further configured to display a game picture in a game task. The processor 106 is configured to respond to the human-computer interaction instructions and control a first virtual operation object to perform a specific operation to complete the game task. The memory 108 is configured to store attribute information of the first virtual operation object and attribute information of a second virtual operation object. The server herein may include, but is not limited to: a database 114 and a processing engine 116. The processing engine 116 is configured to invoke an angle that is stored in the database 114 and that is required for rotating a direction aimed at by an aiming point of a virtual shooting prop, to align with a target position on a second virtual operation object, and when a rotation manner is a time-based rotation manner, automatically rotate, by a target rotation angle according to a predetermined time duration, the direction aimed at by the aiming point, to align with the target position on the second virtual operation object. In this way, an objective of determining, according to the target rotation angle, the rotation manner of the direction aimed at by the aiming point and rotating, according to the time-based rotation manner and a predetermined time duration, the direction aimed at by the aiming point to the target rotation angle is achieved, thereby achieving a technical effect of accurately aligning the aiming point with a target virtual operation object, and resolving a technical problem of relatively low accuracy of aiming at a target object with the aiming point in the related art.

The specific process includes the following steps. The human-computer interaction screen 104 in the terminal device 102 displays an interactive interface for a target game application to run a game task (as shown in FIG. 1, which is a shooting game, the first virtual operation object is sniping a distant target object). S102-S106: Display the aiming point of the virtual shooting prop, the virtual shooting prop being controlled by the first virtual operation object in the target game application, and transmit the aiming point of the virtual shooting prop to the server 112 through the network 110. The server 112 determines, when the second virtual operation object is determined as an attachment target of the virtual shooting prop, according to the angle required for rotating the direction aimed at by the aiming point, to align with the target position on the second virtual operation object, the rotation manner of the direction aimed at by the aiming point; and when the rotation manner is a time-based rotation manner, automatically rotates, by the target rotation angle according to a predetermined time duration, the direction aimed at by the aiming point, to align with the target position on the second virtual operation object. A result determined above is then returned to the terminal device 102.

S108-S112: The terminal device 102 obtains the aiming point of the virtual shooting prop; when a second virtual operation object is determined as the attachment target of the virtual shooting prop, determines, according to the target rotation angle, the rotation manner of the direction aimed at by the aiming point, the target rotation angle being the angle required for rotating the direction aimed at by the aiming point, to align with the target position on the second virtual operation object; and when the rotation manner is a time-based rotation manner, automatically rotates, by the target rotation angle according to a predetermined time duration, the direction aimed at by the aiming point, to align with the target position on the second virtual operation object. In this way, an objective of determining, according to the target rotation angle, the rotation manner of the direction aimed at by the aiming point and rotating, according to the time-based rotation manner and the predetermined time duration, the direction aimed at by the aiming point to the target rotation angle is achieved, thereby achieving the technical effect of accurately aligning the aiming point with the target virtual operation object, and resolving the technical problem of relatively low accuracy of aiming at the target object with the aiming point in the related art.

In some embodiments, the virtual prop control method may be applied to, but is not limited to, a server 112 to assist an application client in aiming at the target object by using the aiming point. The application client may run, but is not limited to, on the terminal device 102. The terminal device 102 may be, but is not limited to, a terminal device that can run application clients, such as a mobile phone, a tablet computer, a notebook computer, a personal computer (PC), and the like. The server 112 and the terminal device 102 may perform, but not limited to, data exchange with each other through a network, and the network may include, but not limited to, a wireless network or a wired network. The wireless network includes: Bluetooth, Wi-Fi, and another network implementing wireless communication. The wired network may include, but not limited to: a wide area network, a metropolitan area network, and a local area network. The foregoing description is merely an example, which is not limited in this embodiment.

The virtual prop control method is applicable to, but is not limited to, only the terminal device 102, or only the server 112, and may be further applicable to an interaction between the terminal device 102 and the server 112.

Figure 2:
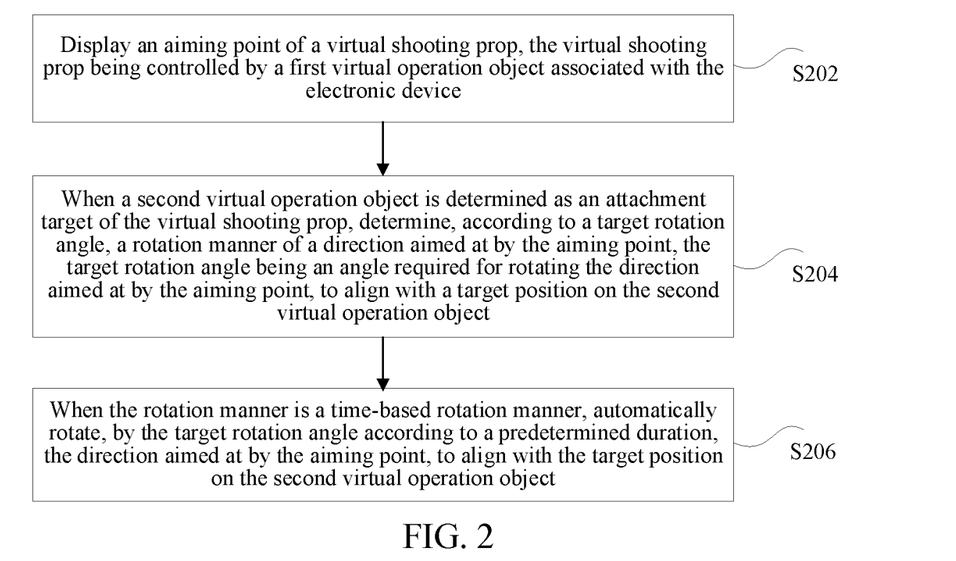
FIG. 2 is a flowchart of an exemplary virtual prop control method according to an embodiment of the present disclosure.

In some embodiments, as shown in FIG. 2, the foregoing virtual prop control method includes the following steps:

S202: Display an aiming point of a virtual shooting prop, the virtual shooting prop being controlled by a first virtual operation object associated with an electronic device.

In some embodiments, the aiming point of the virtual shooting prop may be displayed in a target game application. Correspondingly, the first virtual operation object may be an object in the target game application.

S204: When a second virtual operation object is determined as an attachment target of the virtual shooting prop, determine, according to a target rotation angle, a rotation manner of a direction aimed at by the aiming point, the target rotation angle being an angle required for rotating the direction aimed at by the aiming point, to align with a target position on the second virtual operation object.

S206: When the rotation manner is a time-based rotation manner, automatically rotate, by the target rotation angle according to a predetermined time duration, the direction aimed at by the aiming point, to align with the target position on the second virtual operation object.

In some embodiments, the virtual prop control method may be applicable to, but not limited to a target game application such as a remote shooting game application or a racing game application that requires virtual shooting props to assist a virtual operation object in a game scene to complete game tasks. By controlling the aiming point of the virtual shooting prop controlled by the target virtual operation object, the aiming point is automatically aligned with the target position on the second virtual operation object. The game application may be a multiplayer online battle arena (MOBA) game or a single-player game (SPG). A type of the game application may include, but is not limited to, at least one of the following: a two-dimensional (2D) game application, a three-dimensional (3D) game application, a virtual reality (VR) game application, an augmented reality (AR) game application, and a mixed reality (MR) game application. The foregoing is merely an example, and this embodiment is not limited thereto.

Shooting games include, but are not limited to, all games that use hot weapons for long-range attack, such as first-person shooter games and third-person shooter games.

In some embodiments, the target game application may include, but is not limited to the shooting game. A player controls the first virtual operation object to complete a task in the game. The target position may include, but is not limited to, any position of the body of the second virtual operation object, for example, the head, chest, hands, and the like of the second virtual operation object.

For the attachment target, it may be understood that a position of the aiming point of the virtual shooting prop controlled by the first virtual operation object is in an attachment frame of the second virtual operation object, and the attachment frame is not displayed in the game screen. The virtual shooting props may include, but are not limited to, various types of handguns, sniper guns, and rifles in the game, and may also include a virtual bow and arrow prop for shooting.

Attachment generation means that when an aiming point of a player aims near a target, the player can quickly move the aiming point to a center of the target.

The attachment frame is a collision detection body attached by using a virtual operation object as a center, which can attract an aiming point used for aiming. After detecting that the aiming point is in contact with the attachment frame, the aiming point is controlled to automatically move to the center of the attachment frame.

In some embodiments, the attachment frame, which may include, but is not limited to a 2D plane figure or a 3D solid figure, may not be displayed in a virtual operation interface controlled by the player. The attachment frame may include, but is not limited to a collision detection box with a shape of rectangle (a cuboid and a cylinder), triangle (a cone), circle (a cylinder and a sphere), and the like. The foregoing description is merely an example, and specific types of the attachment frame may include one or a combination of the above. For different virtual operation objects, shapes of attachment frames corresponding to the virtual operation objects may be the same or different. The attachment frame may be set on a virtual operation object controlled by the player or may be set on a virtual operation object preset by a system, and other virtual items such as a vehicle, an oil drum, and a summon may not be set on the attachment frame. The corresponding attachment frame is set for the virtual operation object and an attachment frame is not set for a virtual object other than the virtual operation object, the attachment frame can be effectively used for auxiliary operations, to prevent an attachment frame that is triggered by mistake from performing attachment, thereby reducing computing resources for performing attachment calculations, and reducing computing consumption.

Figure 3:
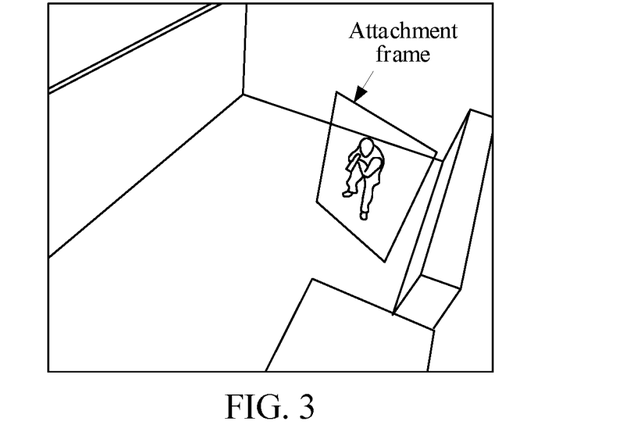
FIG. 3 is a schematic diagram of an attachment frame of an exemplary virtual operation object according to an embodiment of the present disclosure.

In addition, the attachment frame is set as a cuboid (this setting manner is only an embodiment, and the attachment frame may also be set to another type in actual application). A model of the virtual operation object is located at a center of the attachment frame, so that the attachment frame can be symmetrical. Attachment effects are the same regardless of whether attachment is performed from the left or the right, so that the attachment frame is more applicable and is more beneficial to user experience of the player. In addition, because the second virtual operation object is a virtual character, different original sizes of attachment frame collision detection boxes may be set for sizes of different types of virtual characters. In other words, the original size of the attachment frame may be adjusted according to the model of the virtual operation object. The foregoing description is merely an example, and an original position, an original size, and a shape of a specific attachment frame are not limited in the present disclosure. FIG. 3 is a schematic diagram of an attachment frame of a virtual operation object. As shown in FIG. 3, the attachment frame is a cuboid at a periphery of a virtual operation object and surrounds the virtual operation object.

In some embodiments, when the second virtual operation object is determined as the attachment target, an aiming point of the virtual shooting prop controlled by the first virtual operation object may automatically align the aiming point with the second virtual operation object in a time-based rotation manner, and the aiming point of the virtual shooting prop may be accurately aligned with the second virtual operation object, to increase a hit rate for the second virtual operation object.

In some embodiments, the determining, according to a target rotation angle, a rotation manner of a direction aimed at by the aiming point may include the following manners.

Manner I: Determine the rotation manner as the time-based rotation manner when the target rotation angle is greater than a predetermined angle threshold; or Manner II: Determine the rotation manner as the time-based rotation manner when a duration required for rotating by the target rotation angle at a predetermined rotation speed is greater than a predetermined time duration threshold, the predetermined rotation speed being used for indicating an angle of rotation in a unit time.

Figure 4:
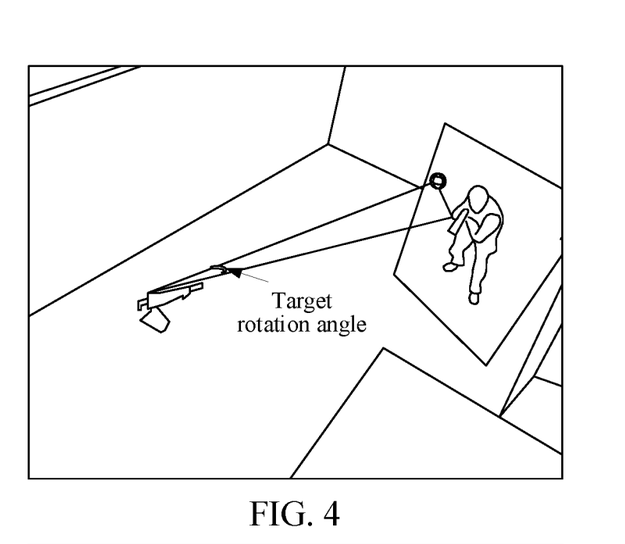
FIG. 4 is a schematic diagram of an exemplary target rotation angle according to an embodiment of the present disclosure.

The rotation manner is determined as the time-based rotation manner when the target rotation angle is greater than the predetermined angle threshold. For example, the predetermined angle threshold is set to 30 degrees, the time-based rotation manner may be understood as a rotation time of 1 second regardless of whether the target rotation angle is 40 degrees or 50 degrees. That is, a time taken by the aiming point to rotate from a current position to a target position is 1 second. FIG. 4 is a schematic diagram of a target rotation angle. An angle shown in FIG. 4 is an angle required for rotating the direction aimed at by the aiming point, to align with the target position on the second virtual operation object, thereby avoiding a case that the aiming point cannot be accurately aligned with the second virtual operation object because of endless movement of the second virtual operation object.

The rotation manner in Manner I may be referred to as time attachment, that is, regardless of what a calculated angle is when the attachment starts, rotation is performed according to a configured time, that is, an attachment speed is irrelevant to the target rotation angle, and the attachment is performed in a fixed time. When the target rotation angle is excessive large, a rotation speed is calculated, for example, an angle is 100 degrees, time is 0.1 second, and the rotation speed is 100 degrees/second, so that the generated attachment is irrelevant to the rotation angle.

The rotation manner is determined as the time-based rotation manner when the duration required for rotating by the target rotation angle at the predetermined rotation speed is greater than the predetermined time duration threshold, the predetermined rotation speed being used for indicating the angle of rotation in a unit time. For example, the target rotation angle is 60 degrees, the predetermined rotation speed is 30 degrees/second, a duration in which the aiming point is rotated to a target position of the second virtual operation object is 2 seconds. When the 2 seconds is greater than the predetermined time duration of 1 second, it is determined that the rotation manner for rotating the aiming point to the target position of the second virtual operation object is the time-based rotation manner, that is, a time taken by the aiming point to rotate from a current position to the target position is 1 second, so that it is ensured that the aiming point may be quickly and accurately rotated to the target position of the second virtual operation object.

With the embodiments provided in this application, the rotation manner of the direction aimed at by the aiming point is determined according to an angle, namely, a target rotation angle, between a position of the aiming point of the virtual shooting prop and a target position of a target virtual operation object; and when the rotation manner is the time-based rotation manner, the direction aimed at by the aiming point is automatically rotated by the target rotation angle according to the predetermined time duration, to align with the target position on the second virtual operation object, thereby achieving a technical effect of accurately aligning the aiming point with the target virtual operation object, and resolving a technical problem of relatively low accuracy of aiming at a target object with the aiming point in the related art.

As an exemplary solution, after the determining, according to a target rotation angle, a rotation manner of a direction aimed at by the aiming point, the method further includes:

when the rotation manner is an angle-based rotation manner, automatically rotating, by the target rotation angle according to the predetermined rotation speed, the direction aimed at by the aiming point, to align with the target position on the second virtual operation object.

The rotation manner that is determined according to the target rotation angle and that is of the direction aimed at by the aiming point may further be the angle-based rotation manner, for example, the rotation speed is 30 degrees/second, when the target rotation angle is 60 degrees, 2 seconds is needed to rotate the aiming point to the target position of the second virtual operation object.

In some embodiments, the determining, according to a target rotation angle, a rotation manner of a direction aimed at by the aiming point includes:

determining the rotation manner as the angle-based rotation manner when the target rotation angle is less than or equal to the predetermined angle threshold; or determining the rotation manner as the angle-based rotation manner when the duration required for rotating by the target rotation angle at the predetermined rotation speed is less than or equal to the predetermined time duration threshold.

When the target rotation angle is less than 30 degrees, the rotation speed is 30 degrees/second, because a duration required for rotation is 1 second, which is equal to the predetermined time duration threshold of 1 second, the aiming point may be rotated to the target position of the second virtual operation object in the angle-based rotation manner, so that the aiming point can be quickly and accurately aligned with the second virtual operation object.

As an exemplary solution, before the determining, according to a target rotation angle, a rotation manner of a direction aimed at by the aiming point, the method further includes:

determining the second virtual operation object as the attachment target of the virtual shooting prop when a ray in the direction aimed at by the aiming point is in contact with an attachment frame of the second virtual operation object and the first virtual operation object performs a target operation, the ray being a straight line formed by using the aiming point as an endpoint and extending along an aimed direction.

Figure 5:
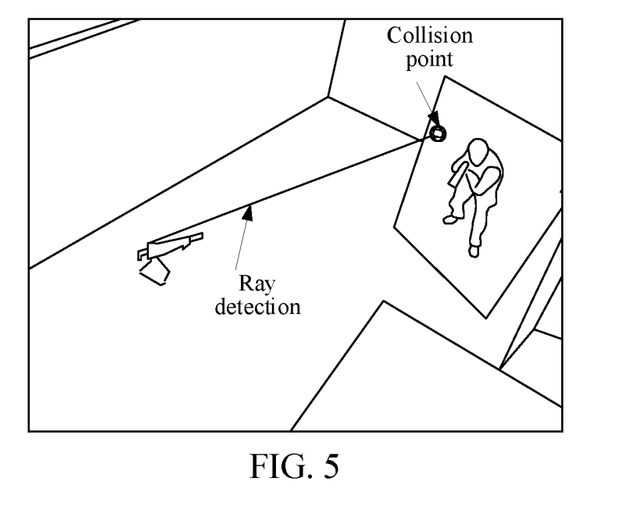
FIG. 5 is a schematic diagram in which a direction aimed at by an exemplary aiming point is contact with an attachment frame of a second virtual operation object according to an embodiment of the present disclosure.

FIG. 5 is a schematic diagram in which a ray in a direction aimed at by an aiming point is in contact with an attachment frame of a second virtual operation object. FIG. 5 shows a schematic diagram of ray detection emitted by a virtual shooting prop, a collision point, and an attachment frame. The ray detection refers to detection based on particle beams or photon beams with specific energy emitted by the virtual shooting prop.

The second virtual operation object is determined as the attachment target of the virtual shooting prop when the direction aimed at by the aiming point of the virtual shooting prop controlled by the first virtual operation object is in contact with the attachment frame of the second virtual operation object and the first virtual operation object performs a moving operation, and/or, a shooting operation, and/or, a rotation operation on the second virtual operation object.

Figure 6:
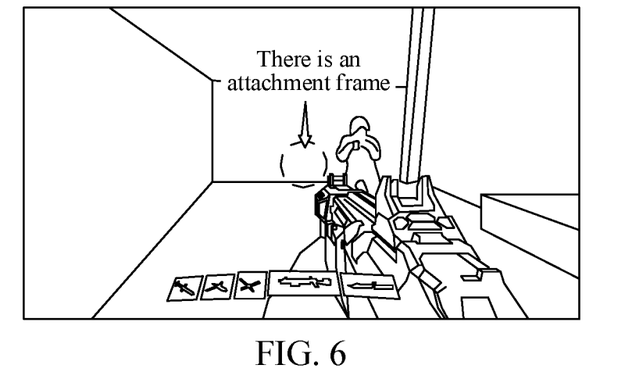
FIG. 6 is a schematic diagram of an exemplary aiming point aiming at an attachment frame of a virtual operation object according to an embodiment of the present disclosure.

In this embodiment of this application, a rectangular collision box is added to a virtual operation object controlled by each player, the rectangular collision box being referred to as an attachment frame. A gun port of a virtual shooting prop controlled by the player emits a ray for detection every frame, the ray being used for detecting whether there is aiming on or inside the attachment frame. FIG. 6 is a schematic diagram of an aiming point aiming at an attachment frame of a virtual operation object.

Figure 7:
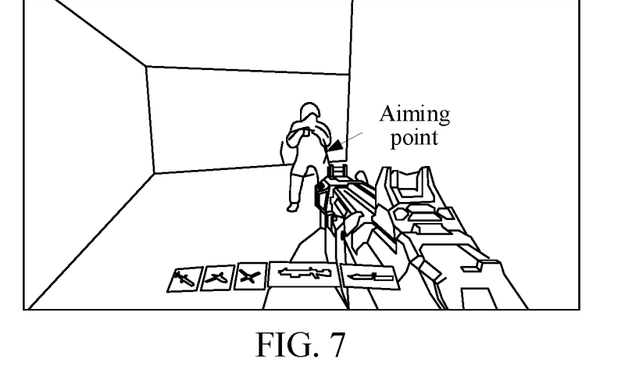
FIG. 7 is a schematic diagram of an exemplary aiming point attached to a target object according to an embodiment of the present disclosure.

If the player performs an arbitrary target operation, an attachment effect is immediately produced, that is, the aiming point is aligned with a target object. The arbitrary operation includes moving, rotating, firing, and the like. FIG. 7 is a schematic diagram of an aiming point attached to a target object. The aiming point movement process is completely automatic and does not require the player to operate rotation, thereby improving alignment experience of the user.

As an exemplary solution, before the determining, according to a target rotation angle, a rotation manner of a direction aimed at by the aiming point, the method further includes:

obtaining, when the direction aimed at by the aiming point is in contact with the attachment frame of the second virtual operation object and the first virtual operation object performs the target operation, a first distance between a source point of the aiming point and the target position, a second distance between the target position and a contact point, and a third distance between the source point and the contact point, the contact point being a point where the direction aimed at by the aiming point is aligned with the attachment frame, and the source point being a position of a shooting port of the virtual shooting prop; and determining the target rotation angle according to at least two of the first distance, the second distance, and the third distance.

The determining the target rotation angle according to at least two of the first distance, the second distance, and the third distance includes: determining the target rotation angle as arccosine (second distance/third distance).

As shown in FIG. 4, the target rotation angle is calculated according to mathematic calculations. When a triangle where the target rotation angle is located is a right triangle, a value of the target rotation angle may be solved according to an inverse function of sine or cosine. If the triangle where the target rotation angle is located is an arbitrary triangle, the value may alternatively be determined based on three sides, that is, the value of the target rotation angle corresponding to the arbitrary triangle may be solved based on an inverse trigonometric function.

As an exemplary solution, before the aiming point of the virtual shooting prop is displayed in the target game application, the method further includes:

configuring a corresponding attachment frame for the second virtual operation object, the attachment frame being a collision detection region with a predetermined shape, the collision detection region moving with movement of a corresponding virtual operation object, and the collision detection region including a damage detection region of the second virtual operation object.

Figure 8:
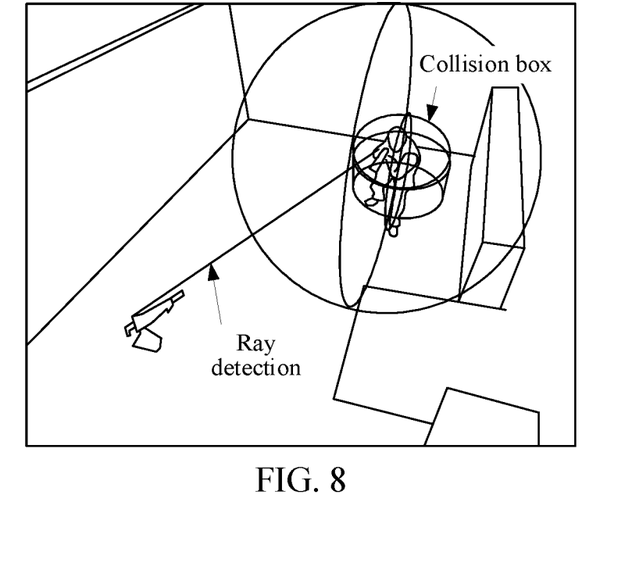
FIG. 8 is a schematic diagram in which an exemplary ray detects a collision box of a target object according to an embodiment of the present disclosure.

FIG. 8 is a schematic diagram in which a ray detects a collision box of a target object. As shown in FIG. 8, a virtual shooting prop emits a ray detection line that collides with the collision box of the target object. When the ray collides with the detection box, an attachment action is stopped, and the aiming point no longer automatically rotates. For example, a character is surrounded with a collision box of an elliptical sphere.

As an exemplary solution, before the determining, according to a target rotation angle, a rotation manner of a direction aimed at by the aiming point, the method further includes: detecting, when the direction aimed at by the aiming point is in contact with the attachment frame of the second virtual operation object, whether the first virtual operation object performs the target operation, the target operation including a moving operation, and/or, a shooting operation, and/or, a rotation operation.

As an exemplary solution, this application further provides an attachment speed control method (which is equivalent to controlling a rotation speed of a virtual prop, that is, equivalent to the virtual prop control method) in a shooting game.

Figure 9:
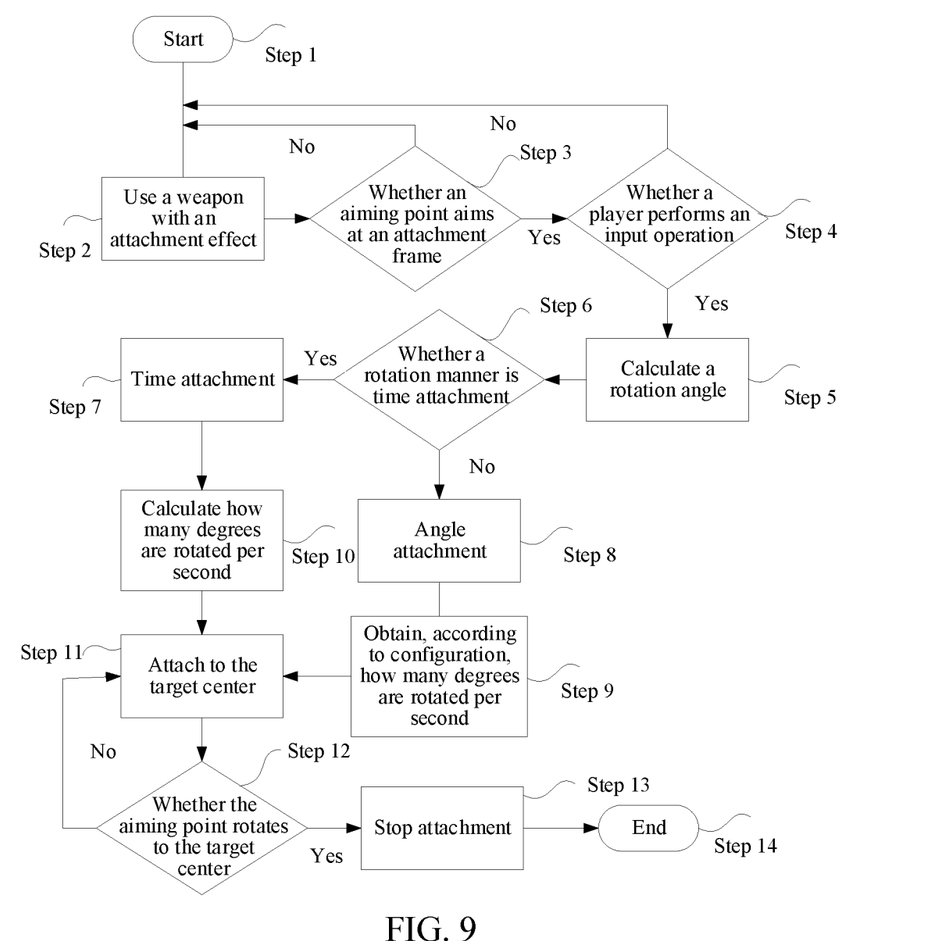
FIG. 9 is a schematic diagram in which an exemplary ray detects a collision box of a target object according to an embodiment of the present disclosure.

FIG. 9 is a flowchart of an exemplary attachment speed control method in a shooting game according to an embodiment of the present disclosure. Specific operations are as follows:

Step 1: Start.

In step 1, a player controls a virtual operation object, the virtual operation object controls a virtual shooting prop, and the virtual operation object controls the virtual shooting prop to aim at another virtual operation object.

Step 2: Use a Weapon with an attachment effect.

The player needs to use the weapon with the attachment effect, because not all weapons in the game have the attachment effect, for example, a throwing weapon and an ultimate skill weapon are weapons that do not have the attachment effect.

Step 3: Determine whether an aiming point aims at an attachment frame. If yes, perform step 3, otherwise, return to step 2.

When the virtual shooting prop (for example, a handgun) controlled by the player aims at another virtual operation object, a gun port of the current handgun continuously emits a detection ray, and the detection ray only detects a collision box on the player. When the ray is contact with the collision box, the attachment effect is satisfied to lock a current target, that is, the other virtual operation object is determined as a target operation object.

Step 4: Determine whether the player performs an input operation. If yes, perform step 5, otherwise, perform step 2.

In step 4, if the player controls the virtual operation object to move, or the player controls the virtual shooting prop by using the virtual operation object to perform operations such as a moving operation, and/or, a shooting operation, and/or, a rotation operation, an angle, namely, a rotation angle, required for rotating a direction aimed at by the aiming point, to align with the target position on the second virtual operation object needs to be calculated during the current detection.

Step 5: Calculate the rotation angle.

Step 6: Determine whether a rotation manner is time attachment (or determine whether a rotation manner is angle attachment). If the rotation manner is the angle attachment, perform step 7, and if the rotation manner is the time attachment, perform step 8.

If it is determined that the rotation manner is not the time attachment, the rotation manner is the angle attachment.

In step 6, an angle that needs to be moved is calculated. As shown in FIG. 5, lengths of all sides of the right triangle can be obtained through calculation. According to the three sides of the triangle, a rotation angle O is obtained according to a trigonometric function formula such as an inverse cosine function, and according to the angle O, a time and a speed required for attaching to a target center can be calculated respectively in the two manners of angle attachment and time attachment.

The angle attachment refers to rotating according to a predetermined angular velocity, for the aiming point to be aligned with a target position on a target virtual operation object, for example, rotating at a speed of 30 degrees/second.

The time attachment refers to rotating according to a predetermined time, for the aiming point to be aligned with the target position on the target virtual operation object. That is, regardless of what a size of the rotation angle is, a predetermined time can be set for rotating, for the aiming point to be aligned with the target position on the target virtual operation object. For example, if the rotation angle is 50 degrees, a rotation time required may be 1 second, and if the rotation angle is 80 degrees, a rotation time required may also be 1 second. That is, a factor of rotation angle (that is, a distance) is not considered.

Step 7: Time attachment.
Step 8: Angle attachment.
Step 9: Obtain, according to configuration, how many degrees are rotated per second.
Step 10: Calculate how many degrees are rotated per second.
Step 11: Attach to the target center.
Step 12: Determine whether to rotate to the target center. If yes, perform step 13, otherwise, perform step 11.
Step 13: Stop attachment.

When the aiming point moves to a center of a target object (a character), ray detection is performed to detect a collision box on the character, and the aiming point is aligned with the target object. That is, an attachment operation can be stopped.

Step 14: End.

In this embodiment, the player may select an attachment solution of either one of the two manners, for the player to align with the target position of the target object more quickly and accurately, thereby improving a hit rate and improving user experience of the game.

FIG. 1, FIG. 2, and FIG. 9 are schematic flowcharts of a virtual prop control method according to an embodiment. It is to be understood that, although each step of the flowcharts in FIG. 1, FIG. 2, and FIG. 9 is displayed sequentially according to arrows, the steps are not necessarily performed according to an order indicated by arrows. Unless clearly specified in this specification, there is no strict sequence limitation on the execution of the steps, and the steps may be performed in another sequence. In addition, at least some steps in FIG. 1, FIG. 2, and FIG. 9 may include a plurality of substeps or a plurality of stages. The substeps or the stages are not necessarily performed at the same moment, and instead may be performed at different moments. The substeps or the stages are not necessarily performed sequentially, and instead may be performed in turn or alternately with another step or at least some of substeps or stages of the other step.

For ease of description, the foregoing method embodiments are represented as a series of action combinations, but a person skilled in the art is to learn that the present disclosure is not limited to the described order of the actions because some steps may be performed in another order or performed simultaneously according to the present disclosure. In addition, a person skilled in the art is to also appreciate that all the embodiments described in the specification are preferred embodiments, and the related actions and modules are not necessarily mandatory to the present disclosure.

Figure 10:
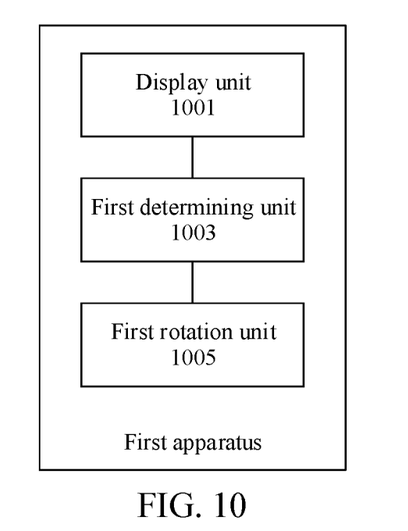
FIG. 10 is a schematic structural diagram of an exemplary virtual prop control apparatus according to an embodiment of the present disclosure.

According to another aspect of the embodiments of the present disclosure, a virtual prop control apparatus configured to implement the foregoing virtual prop control method is further provided. As shown in FIG. 10, the apparatus includes a display unit 1001, a first determining unit 1003, and a first rotation unit 1005.

The display unit 1001 is configured to display an aiming point of a virtual shooting prop, the virtual shooting prop being controlled by a first virtual operation object.

The first determining unit 1003 is configured to when a second virtual operation object is determined as an attachment target of the virtual shooting prop, determine, according to a target rotation angle, a rotation manner of a direction aimed at by the aiming point, the target rotation angle being an angle required for rotating the direction aimed at by the aiming point, to align with a target position on the second virtual operation object.

The first rotation unit 1005 is configured to when the rotation manner is a time-based rotation manner, automatically rotate, by the target rotation angle according to a predetermined time duration, the direction aimed at by the aiming point, to align with the target position on the second virtual operation object.

The first determining unit 1003 may include:
a first determining module, configured to determine the rotation manner as the time-based rotation manner when the target rotation angle is greater than a predetermined angle threshold; or
a second determining module, configured to determine the rotation manner as the time-based rotation manner when a duration required for rotating by the target rotation angle at a predetermined rotation speed is greater than a predetermined time duration threshold, the predetermined rotation speed being used for indicating an angle of rotation in a unit time.

With the embodiments provided in this application, the rotation manner of the direction aimed at by the aiming point is determined according to an angle, that is, a target rotation angle, between a position of the aiming point of the virtual shooting prop and a target position of a target virtual operation object; and when the rotation manner is the time-based rotation manner, the direction aimed at by the aiming point is automatically rotated by the target rotation angle according to the predetermined time duration, to align with the target position on the second virtual operation object, thereby achieving a technical effect of accurately aligning the aiming point with the target virtual operation object, and resolving a technical problem of relatively low accuracy of aiming at a target object with the aiming point in the related art.

In some embodiments, the apparatus further includes:
a second rotation unit, configured to, after the rotation manner of the direction aimed at by the aiming point is determined according to the target rotation angle, and when the rotation manner is an angle-based rotation manner, automatically rotate, by the target rotation angle according to the predetermined rotation speed, the direction aimed at by the aiming point, to align with the target position on the second virtual operation object.

The second rotation unit may include:
a third determining module, configured to determine the rotation manner as the angle-based rotation manner when the target rotation angle is less than or equal to the predetermined angle threshold; or
a fourth determining module, configured to determine the rotation manner as the angle-based rotation manner when the duration required for rotating by the target rotation angle at the predetermined rotation speed is less than or equal to the predetermined time duration threshold.

In some embodiments, the apparatus further includes:
a second determining unit, configured to determine, before the rotation manner of the direction aimed at by the aiming point is determined according to the target rotation angle, the second virtual operation object as the attachment target of the virtual shooting prop when the direction aimed at by the aiming point is in contact with an attachment frame of the second virtual operation object and the first virtual operation object performs a target operation.

In some embodiments, the apparatus further includes:
an obtaining unit, configured to obtain, before the rotation manner of the direction aimed at by the aiming point is determined according to the target rotation angle, and when the direction aimed at by the aiming point is in contact with the attachment frame of the second virtual operation object and the first virtual operation object performs the target operation, a first distance between a source point of the aiming point and the target position, a second distance between the target position and a contact point, and a third distance between the source point and the contact point, the contact point being a point where the direction aimed at by the aiming point is aligned with the attachment frame, and the source point being a position of a shooting port of the virtual shooting prop; and a third determining unit, configured to determine the target rotation angle according to at least two of the first distance, the second distance, and the third distance.

The third determining unit includes:

a fifth determining module, configured to determine the target rotation angle as arcsine (the second distance/the third distance), or arccosine (the second distance/the third distance).

In some embodiments, the apparatus further includes:

a configuration unit, configured to configure, before the aiming point of the virtual shooting prop is displayed in a target game application, a corresponding attachment frame for the second virtual operation object, the attachment frame being a collision detection region with a predetermined shape, the collision detection region moving with movement of a corresponding virtual operation object, and the collision detection region including a damage detection region of the second virtual operation object.

In some embodiments, the apparatus further includes:

a detection unit, configured to detect, before the rotation manner of the direction aimed at by the aiming point is determined according to the target rotation angle, and when a ray in the direction aimed at by the aiming point is in contact with the attachment frame of the second virtual operation object, whether the first virtual operation object performs the target operation, the target operation including a moving operation, and/or, a shooting operation, and/or, a rotation operation.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 11:
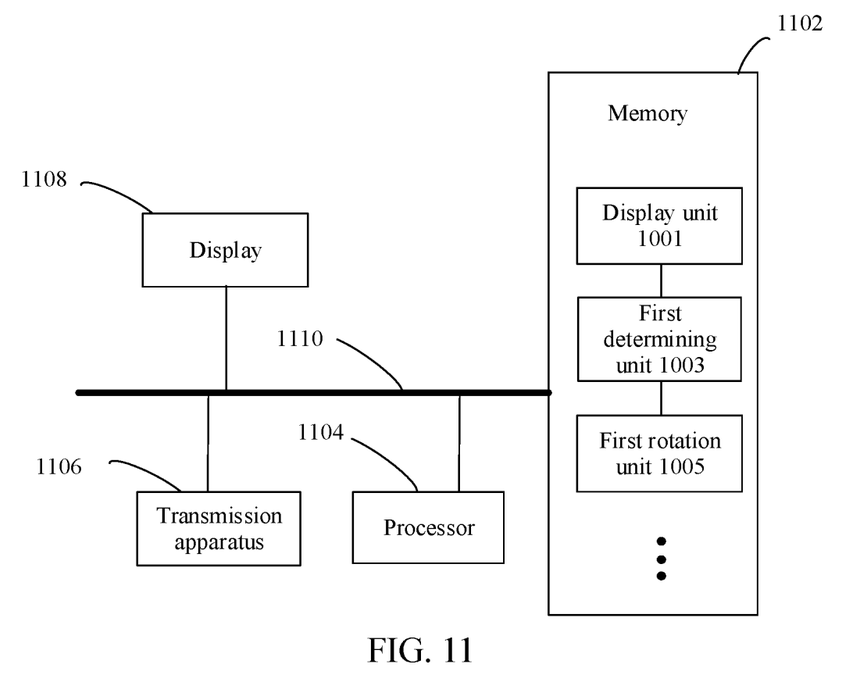
FIG. 11 is a schematic structural diagram of an electronic device of an exemplary virtual prop control method according to an embodiment of the present disclosure.

According to still another aspect of the embodiments of the present disclosure, an electronic device configured to implement the virtual prop control method is further provided. As shown in FIG. 11, the electronic device includes a memory 1102 and a processor 1104. The memory 1102 stores a computer program. The processor 1104 is configured to perform steps in any one of the foregoing method embodiments through the computer program.

In some embodiments, the electronic device may be located in at least one of a plurality of network devices located in a computer network.

In some embodiments, the processor may be configured to perform the following steps through a computer program:

S1: Display an aiming point of a virtual shooting prop in a target game application, the virtual shooting prop being controlled by a first virtual operation object in the target game application.

S2: When a second virtual operation object is determined as an attachment target of the virtual shooting prop, determine, according to a target rotation angle, a rotation manner of a direction aimed at by the aiming point, the target rotation angle being an angle required for rotating the direction aimed at by the aiming point, to align with a target position on the second virtual operation object.

S3. When the rotation manner is a time-based rotation manner, automatically rotate, by the target rotation angle according to a predetermined time duration, the direction aimed at by the aiming point, to align with the target position on the second virtual operation object.

In some embodiments, a person of ordinary skill in the art may understand that, the structure shown in FIG. 11 is only illustrative. The electronic device may also be a terminal device such as a smartphone (such as an Android mobile phone or an iOS mobile phone), a tablet computer, a palmtop computer, a mobile Internet device (MID), or a PAD. FIG. 11 does not limit the structure of the electronic device. For example, the electronic device may further include more or fewer components (such as a network interface) than those shown in FIG. 11, or have a configuration different from that shown in FIG. 11.

The memory 1102 may be configured to store software programs and modules, for example, program instructions/modules corresponding to the virtual prop control method and apparatus in the embodiments of the present disclosure. The processor 1104 runs the software programs and modules stored in the memory 1102, to perform various functional applications and data processing, to be specific, implement the foregoing virtual prop control method. The memory 1102 may include a high-speed random access memory (RAM), and may also include a non-volatile memory, for example, one or more magnetic storage apparatuses, a flash memory, or another non-volatile solid-state memory. In some examples, the memory 1102 may further include memories remotely disposed relative to the processor 1104, and the remote memories may be connected to a terminal through a network. The foregoing examples of the network include, but are not limited to, the Internet, an intranet, a local area network, a mobile communication network, and a combination thereof. The memory 1102 may be further configured to, but is not limited to, store attribute information of a first virtual operation object, information about angle between an aiming point of a virtual shooting prop and a target position of a second virtual operation object, and attribute information of the second virtual operation object. In an example, as shown in FIG. 11, the memory 1102 may include, but is not limited to, the display unit 1001, the first determining unit 1003, and the first rotation unit 1005 in the virtual prop control apparatus. In addition, the memory may further include, but is not limited to, other module units in the virtual prop control apparatus. The other module units are not described in detail in this example.

In some embodiments, a transmission apparatus 1106 is configured to receive or transmit data by using a network. Specific examples of the network may include a wired network and a wireless network. In an example, the transmission apparatus 1106 includes a network interface controller (NIC). The NIC may be connected to another network device and a router by using a network cable, so as to communicate with the Internet or a local area network. In an example, the transmission apparatus 1106 is a radio frequency (RF) module, which communicates with the Internet in a wireless manner.

In addition, the electronic device further includes: a display 1108, configured to display the game picture in the target game application, and a connection bus 1110, configured to connect module components in the electronic device.

According to still another aspect of the embodiments of the present disclosure, a computer-readable storage medium is further provided. The computer-readable storage medium stores a computer program, the computer program being configured to perform steps in any one of the foregoing method embodiments when being run.

In some embodiments, the computer-readable storage medium may be configured to store a computer program for performing the following steps:

S1: Display an aiming point of a virtual shooting prop in a target game application, the virtual shooting prop being controlled by a first virtual operation object in the target game application.

S2: When a second virtual operation object is determined as an attachment target of the virtual shooting prop, determine, according to a target rotation angle, a rotation manner of a direction aimed at by the aiming point, the target rotation angle being an angle required for rotating the direction aimed at by the aiming point, to align with a target position on the second virtual operation object.

S3. When the rotation manner is a time-based rotation manner, automatically rotate, by the target rotation angle according to a predetermined time duration, the direction aimed at by the aiming point, to align with the target position on the second virtual operation object.

In an embodiment, a computer program product or computer program is provided, the computer program product or computer program including computer instructions, and the computer instructions being stored in a computer-readable storage medium; and when a processor of an electronic device reads the computer instructions from the computer-readable storage medium and executes the computer instructions, the electronic device is caused to perform the virtual prop control method.

In some embodiments, a person of ordinary skill in the art may understand that all or some procedures in the methods in the foregoing embodiments may be implemented by using a computer program instructing related hardware. The program may be stored in a non-volatile computer readable storage medium. When the program is executed, procedures of the embodiments of the foregoing methods may be included. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a RAM or an external cache. As an illustration instead of a limitation, the RAM is available in various forms, such as a static RAM (SRAM), a dynamic RAM (DRAM), a synchronous DRAM (SDRAM), a double data rate SDRAM (DDR-SDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

The sequence numbers of the embodiments of the present disclosure are merely for the description purpose but do not imply the preference among the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the present disclosure essentially, or the part contributing to the related art, or all or some of the technical solutions may be presented in the form of a software product. The computer software product is stored in the storage medium, and includes several instructions for instructing one or more computer devices (which may be a PC, a server, a network device, or the like) to perform all or some of the steps of the methods described in the embodiments of the present disclosure.

In the foregoing embodiments of the present disclosure, the descriptions of the embodiments have different focuses. For a part that is not detailed in an embodiment, reference may be made to the relevant description of other embodiments.

In the several embodiments provided in this application, it is to be understood that the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may be physically separated, or two or more units may be integrated into one unit. The integrated unit may be implemented in a form of hardware, or may be implemented in a form of a software functional unit.

The foregoing descriptions are exemplary implementations of the present disclosure. A person of ordinary skill in the art may make some improvements and modifications without departing from the principle of the present disclosure and the improvements and modifications shall fall within the protection scope of the present disclosure.

What is claimed is:

1. A virtual prop control method performed by an electronic device, the method comprising:
   displaying an aiming point of a virtual shooting prop, the virtual shooting prop being controlled by a first virtual operation object associated with the electronic device;
   when a second virtual operation object is determined as an attachment target of the virtual shooting prop, determining a target rotation angle, the target rotation angle being an angle required for rotating the direction aimed at by the aiming point, to align with a target position on the second virtual operation object;
   in accordance with a determination that the target rotation angle is not greater than a predetermined angle threshold, automatically rotating the direction aimed at by the aiming point by the target rotation angle to align the aiming point with the target position on the second virtual operation object in an angle-based rotation manner at a predetermined rotation speed; and in accordance with a determination that the target rotation angle is greater than the predetermined angle threshold, automatically rotating the direction aimed at by the aiming point by the target rotation angle to align the aiming point with the target position on the second virtual operation object in a time-based rotation manner at a predetermined time duration, wherein the predetermined time duration is no less than a multiplication of the predetermined rotation speed and the predetermined angle threshold.

2. The method according to claim 1, further comprising:
before determining the target rotation angle:
detecting that the first virtual operation object performs a target operation; and
determining the second virtual operation object as the attachment target of the virtual shooting prop when the direction aimed at by the aiming point is in contact with an attachment frame of the second virtual operation object.

3. The method according to claim 2, further comprising:
when the direction aimed at by the aiming point is in contact with the attachment frame of the second virtual operation object, obtaining a first distance between a source point of the aiming point and the target position, a second distance between the target position and a contact point, and a third distance between the source point and the contact point, the contact point being a point where the direction aimed at by the aiming point is aligned with the attachment frame, and the source point being a position of a shooting port of the virtual shooting prop; and
determining the target rotation angle according to at least two of the first distance, the second distance, and the third distance.

4. The method according to claim 2, further comprising:
before displaying the aiming point of the virtual shooting prop:
configuring a corresponding attachment frame for the second virtual operation object, the attachment frame being a collision detection region with a predetermined shape, the collision detection region moving with movement of a corresponding virtual operation object, and the collision detection region comprising a damage detection region of the second virtual operation object.

5. The method according to claim 2, further comprising:
detecting, when a ray in the direction aimed at by the aiming point is in contact with the attachment frame of the second virtual operation object, whether the first virtual operation object performs the target operation, the target operation comprising a moving operation, and/or, a shooting operation, and/or, a rotation operation.

6. The method according to claim 3, wherein the determining the target rotation angle according to at least two of the first distance, the second distance, and the third distance comprises:
determining the target rotation angle as arcsine (the second distance/the third distance), or arccosine (the first distance/the third distance).

7. An electronic device, comprising a memory and a processor, the memory storing a plurality of computer programs that, when executed by the processor, cause the electronic device to perform a plurality of operations including:
displaying an aiming point of a virtual shooting prop, the virtual shooting prop being controlled by a first virtual operation object associated with the electronic device;
when a second virtual operation object is determined as an attachment target of the virtual shooting prop, determining a target rotation angle, the target rotation angle being an angle required for rotating the direction aimed at by the aiming point, to align with a target position on the second virtual operation object;
in accordance with a determination that the target rotation angle is not greater than a predetermined angle threshold, automatically rotating the direction aimed at by the aiming point by the target rotation angle to align the aiming point with the target position on the second virtual operation object in an angle-based rotation manner at a predetermined rotation speed; and
in accordance with a determination that the target rotation angle is greater than the predetermined angle threshold, automatically rotating the direction aimed at by the aiming point by the target rotation angle to align the aiming point with the target position on the second virtual operation object in a time-based rotation manner at a predetermined time duration, wherein the predetermined time duration is no less than a multiplication of the predetermined rotation speed and the predetermined angle threshold.

8. The electronic device according to claim 7, wherein the plurality of operations further comprise: before determining the target rotation angle: detecting that the first virtual operation object performs a target operation; and determining the second virtual operation object as the attachment target of the virtual shooting prop when the direction aimed at by the aiming point is in contact with an attachment frame of the second virtual operation object.

9. The electronic device according to claim 8, wherein the plurality of operations further comprise:
detecting, when a ray in the direction aimed at by the aiming point is in contact with the attachment frame of the second virtual operation object, whether the first virtual operation object performs the target operation, the target operation comprising a moving operation, and/or, a shooting operation, and/or, a rotation operation.

10. The electronic device according to claim 8, wherein the plurality of operations further comprise:
when the direction aimed at by the aiming point is in contact with the attachment frame of the second virtual operation object, obtaining a first distance between a source point of the aiming point and the target position, a second distance between the target position and a contact point, and a third distance between the source point and the contact point, the contact point being a point where the direction aimed at by the aiming point is aligned with the attachment frame, and the source point being a position of a shooting port of the virtual shooting prop; and
determining the target rotation angle according to at least two of the first distance, the second distance, and the third distance.

11. The electronic device according to claim 8, wherein the plurality of operations further comprise:
before displaying the aiming point of the virtual shooting prop:
configuring a corresponding attachment frame for the second virtual operation object, the attachment frame being a collision detection region with a predetermined shape, the collision detection region moving with movement of a corresponding virtual operation object, and the collision detection region comprising a damage detection region of the second virtual operation object.

12. The electronic device according to claim 10, wherein the determining the target rotation angle according to at least two of the first distance, the second distance, and the third distance comprises:
  determining the target rotation angle as arcsine (the second distance/the third distance), or arccosine (the first distance/the third distance).

13. A non-transitory computer-readable storage medium, comprising a plurality of computer programs stored therein, wherein the computer programs, when executed by a processor of an electronic device, cause the electronic device to perform a plurality of operations including:
  displaying an aiming point of a virtual shooting prop, the virtual shooting prop being controlled by a first virtual operation object associated with the electronic device;
  when a second virtual operation object is determined as an attachment target of the virtual shooting prop, determining a target rotation angle, the target rotation angle being an angle required for rotating the direction aimed at by the aiming point, to align with a target position on the second virtual operation object;
  in accordance with a determination that the target rotation angle is not greater than a predetermined angle threshold, automatically rotating the direction aimed at by the aiming point by the target rotation angle to align the aiming point with the target position on the second virtual operation object in an angle-based rotation manner at a predetermined rotation speed; and
  in accordance with a determination that the target rotation angle is greater than the predetermined angle threshold, automatically rotating the direction aimed at by the aiming point by the target rotation angle to align the aiming point with the target position on the second virtual operation object in a time-based rotation manner at a predetermined time duration, wherein the predetermined time duration is no less than a multiplication of the predetermined rotation speed and the predetermined angle threshold.

14. The non-transitory computer-readable storage medium according to claim 13, wherein the plurality of operations further comprise:
  before determining the target rotation angle:
  detecting that the first virtual operation object performs a target operation; and
  determining the second virtual operation object as the attachment target of the virtual shooting prop when the direction aimed at by the aiming point is in contact with an attachment frame of the second virtual operation object.

15. The non-transitory computer-readable storage medium according to claim 13, wherein the plurality of operations further comprise:
  before displaying the aiming point of the virtual shooting prop:
  configuring a corresponding attachment frame for the second virtual operation object, the attachment frame being a collision detection region with a predetermined shape, the collision detection region moving with movement of a corresponding virtual operation object, and the collision detection region comprising a damage detection region of the second virtual operation object.

16. The non-transitory computer-readable storage medium according to claim 14, wherein the plurality of operations further comprise:
  when the direction aimed at by the aiming point is in contact with the attachment frame of the second virtual operation object, obtaining a first distance between a source point of the aiming point and the target position, a second distance between the target position and a contact point, and a third distance between the source point and the contact point, the contact point being a point where the direction aimed at by the aiming point is aligned with the attachment frame, and the source point being a position of a shooting port of the virtual shooting prop; and
  determining the target rotation angle according to at least two of the first distance, the second distance, and the third distance.

17. The non-transitory computer-readable storage medium according to claim 16, wherein the determining the target rotation angle according to at least two of the first distance, the second distance, and the third distance comprises:
  determining the target rotation angle as arcsine (the second distance/the third distance), or arccosine (the first distance/the third distance).

18. The non-transitory computer-readable storage medium according to claim 15, wherein the plurality of operations further comprise: detecting, when a ray in the direction aimed at by the aiming point is in contact with the attachment frame of the second virtual operation object, whether the first virtual operation object performs the target operation, the target operation comprising a moving operation, and/or, a shooting operation, and/or, a rotation operation.

* * * * *